No. 823,584. PATENTED JUNE 19, 1906.
J. S. COSTA.
CUTTING OR DRESSING TOOL FOR MARBLE, STONE, &c.
APPLICATION FILED DEC. 4, 1905.

Witnesses:
Fred S. Greenleaf
Walter R. Trott

Inventor.
Joseph S. Costa,
by Crosby Gregory
attys.

UNITED STATES PATENT OFFICE.

JOSEPH S. COSTA, OF QUINCY, MASSACHUSETTS.

CUTTING OR DRESSING TOOL FOR MARBLE, STONE, &c.

No. 823,584.  Specification of Letters Patent.  Patented June 19, 1906.

Application filed December 4, 1905. Serial No. 290,063.

*To all whom it may concern:*

Be it known that I, JOSEPH S. COSTA, a citizen of the United States, residing at Quincy, in the county of Norfolk and State of Massachusetts, have invented an Improvement in Cutting or Dressing Tools for Marble, Stone, &c., of which the following description, in connection with the accompanying drawings, is a specification, like letters on the drawings representing like parts.

This invention relates to a novel tool for cutting, dressing, and surfacing marble, stone, and the like.

My novel tool comprises a spindle having a hollow head, a bit or bits located therein, and a wedge interposed between a bit and the wall of the head, the point of the wedge being maintained uppermost and being kept seated in its operative position by a blow from the usual hammer on the upper end of the spindle.

Figure 1:
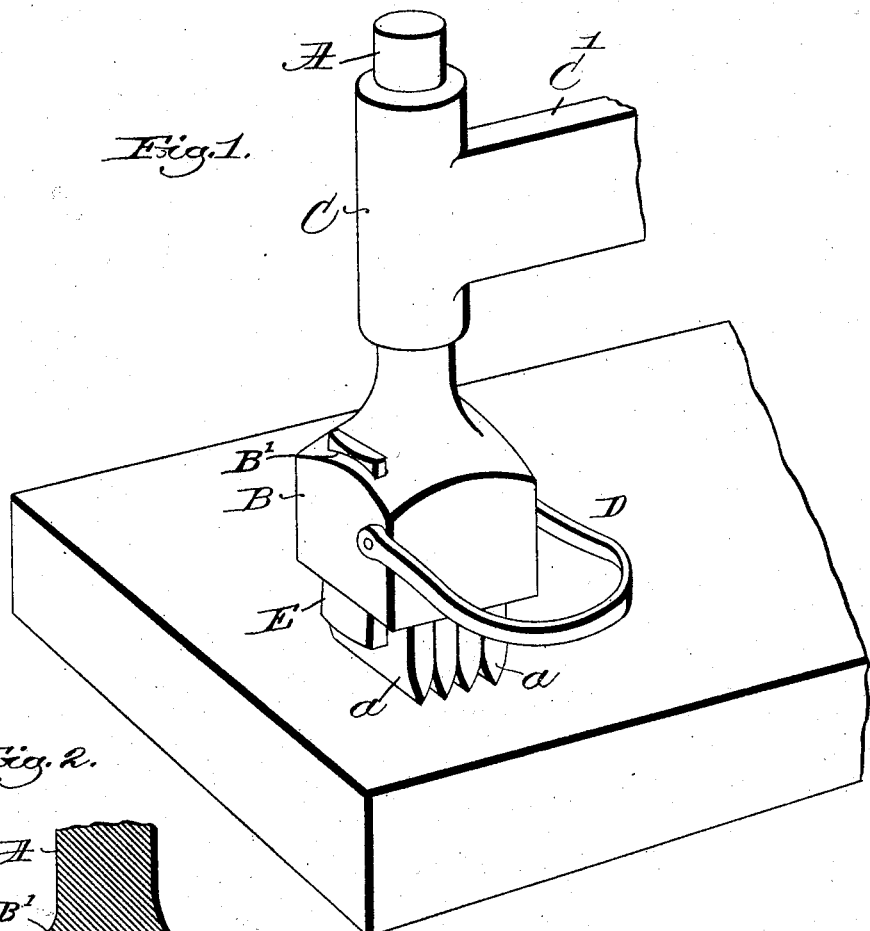
Figure 2:
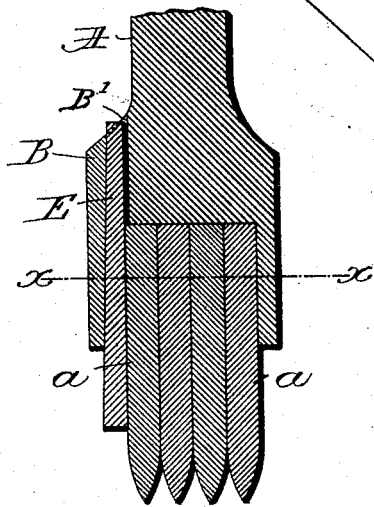
Figure 3:
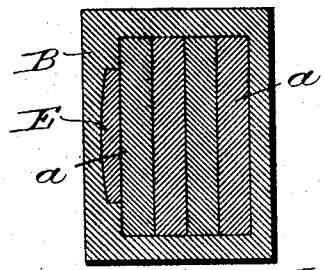

Figure 1 in elevation shows one of my novel tools supposed to be standing on a block of stone or marble to be cut, smoothed, or shaped. Fig. 2 is a partial vertical section of the tool, its bits, and wedge shown in Fig. 1. Fig. 3 is a horizontal section in the line $x'$, Fig. 2.

The tool comprises a metal spindle or rod A, having at its lower end a hollow head B, the top of which is shown as having a slot B'. The head receives and holds a series of steel bits or cutting-blades $a$, represented as four in number, but any desired number of bits may be employed, one or more.

In practice the spindle will be held loosely in a sleeve or bearing C, forming part of the frame C' of any usual machine commonly employing bits of the class described to cut, dress, or smooth stone, the frame being movable with the spindle over the work being cut dressed, or smoothed. The head is shown as provided with a handpiece D, by which the operator may move the tool and the head in any direction to place the bits in contact with any part of the surface of the stone or marble to be acted upon. Heretofore these bits have been slotted in the direction of their length and two bolts have been thrust through holes in the head and the bits, and by nuts the bolts have been tightened to thus clamp and hold the bits in the head. I desire to do away with the usual bolts and the necessity of cutting slots in the bits, which are of steel, and consequently I have provided the wedge E, the thinner end of which (see Figs. 1 and 2) stands uppermost, and this wedge is inserted between the inner side of one of the walls of the head and one of the bits. (See Figs. 2 and 3.) The wedge is driven into the space between the head and bits, as shown in Figs. 1 and 2, and the smaller end of the wedge extends normally through the slot B' in the top of the head. In use I find that this wedge holds the bits securely in the head, and the wedge having been once driven in place each blow of the usual hammer on the upper end of the spindle has a tendency to draw the wedge farther into the head, while the force of the blow on the spindle as the same hammer completes its full operative stroke causes the bits in contact with the marble or stone being cut or smoothed to complete the stroke and cut or smooth the stone or marble in usual manner. The wedge preferably will be made oval or convex at its side next in contact with the head.

Having described my invention, what I claim as new, and desire to secure by Letters Patent, is—

1. In a machine for dressing stone and the like, a tool comprising a head, a series of bits contained within said head, a wedge freely inserted with its small end uppermost between the bits and one side of the head, a spindle projecting upward from the head to receive the blows of any suitable hammering device, said blows serving to seat the wedge firmly in place to bind the bits in the head.

2. In a machine for dressing stone and the like, a tool comprising a head, a series of bits contained within said head, a wedge freely inserted with its small end uppermost between the bits and one side of the head, a spindle projecting upward from the head to receive the blow of any suitable hammering device, a sleeve loosely embracing the spindle above the head, said blows serving to seat the wedge firmly in place to bind the bits in the head.

In testimony whereof I have signed my name to this specification in the presence of two subscribing witnesses.

JOSEPH S. COSTA.

Witnesses:
 GEO. W. GREGORY,
 MARGARET A. DUNNE.